United States Patent
Sugae et al.

(10) Patent No.: US 11,107,351 B2
(45) Date of Patent: Aug. 31, 2021

(54) VEHICLE GUIDANCE SYSTEM, ONBOARD APPARATUS, AND GROUND APPARATUS

(71) Applicant: AISIN SEIKI KABUSHIKI KAISHA, Kariya (JP)

(72) Inventors: Ippei Sugae, Kariya (JP); Atsuo Fukaya, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 99 days.

(21) Appl. No.: 16/690,306

(22) Filed: Nov. 21, 2019

(65) Prior Publication Data
US 2020/0168087 A1   May 28, 2020

(30) Foreign Application Priority Data
Nov. 27, 2018   (JP) .............................. JP2018-221066

(51) Int. Cl.
| | |
|---|---|
| *G08G 1/09* | (2006.01) |
| *G08G 1/0968* | (2006.01) |
| *G05D 1/02* | (2020.01) |

(52) U.S. Cl.
CPC . *G08G 1/096827* (2013.01); *G08G 1/096811* (2013.01); *G05D 1/0212* (2013.01); *G05D 2201/0213* (2013.01)

(58) Field of Classification Search
CPC ....... G08G 1/096827; G08G 1/096811; G08G 1/145; G05D 2201/0213; G05D 1/0212; G05D 1/0234; G05D 1/0225; B60W 30/06
See application file for complete search history.

(56) References Cited

U.S. PATENT DOCUMENTS

| | | | |
|---|---|---|---|
| 2015/0328995 A1* | 11/2015 | Konno | .................... H02J 7/025 320/108 |
| 2018/0247535 A1* | 8/2018 | Mielenz | .................. G06T 7/248 |

FOREIGN PATENT DOCUMENTS

JP   2010-188744 A   9/2010

* cited by examiner

*Primary Examiner* — Rodney A Butler
(74) *Attorney, Agent, or Firm* — Sughrue Mion, PLLC

(57) ABSTRACT

A vehicle guidance system includes an onboard apparatus and a ground apparatus. The onboard apparatus includes a guide controller guiding a vehicle to enter a predetermined area through an entrance, a transmission controller transmitting a first wave, and a reception controller receiving a second wave obtained in response to the first wave. The ground apparatus includes a plurality of ground receivers arranged at a first position and a second position to receive the first wave, the first position and the second position corresponding to opposed ends of the entrance, and a plurality of first ground transmitters provided corresponding to the ground receivers and transmitting the second wave in a direction opposite to an entry direction of the vehicle. The guide controller determines an entry line to the entrance based on a change of a signal level of the second wave, the signal level changing depending on a vehicle position.

10 Claims, 8 Drawing Sheets

VEHICLE GUIDANCE SYSTEM, ONBOARD APPARATUS, AND GROUND APPARATUS

CROSS REFERENCE TO RELATED APPLICATIONS

This application is based on and claims priority under 35 U.S.C. § 119 to Japanese Patent Application 2018-221066, filed on Nov. 27, 2018, the entire content of which is incorporated herein by reference.

TECHNICAL FIELD

This disclosure generally relates to a vehicle guidance system, an onboard apparatus, and a ground apparatus.

BACKGROUND DISCUSSION

Information obtained on a basis of an image of surroundings of a vehicle that is acquired by an onboard camera is provided to guide the vehicle to a predetermine area. Such technique is disclosed, for example, in JP2010-188744A.

The information included in the image usually varies depending on brightness in environment where the image is captured. In a case where a vehicle is guided using the aforementioned technique in autonomous (semi-autonomous) driving, for example, accuracy in guiding the vehicle may vary depending on environment.

A need thus exists for a vehicle guidance system, an onboard apparatus, and a ground apparatus which are not susceptible to the drawback mentioned above.

SUMMARY

According to an aspect of this disclosure, a vehicle guidance system includes an onboard apparatus configured to be mounted at a vehicle, and a ground apparatus configured to be provided on a ground. The onboard apparatus includes a guide controller performing a guide control for guiding the vehicle to enter a predetermined area through an entrance thereof, the predetermined area being provided on the ground, a transmission controller performing a transmission control for transmitting a first wave to an outside of the vehicle by an onboard transmitter that is configured to be mounted at the vehicle, the transmission control being performed in preparation for the guide control performed by the guide controller, and a reception controller performing a reception control for receiving a second wave obtained in response to the first wave by an onboard receiver that is configured to be mounted at the vehicle. The ground apparatus includes a plurality of ground receivers at least one of which is configured to be arranged at a first position and at least one of which is configured to be arranged at a second position to receive the first wave, the first position and the second position corresponding to opposed ends of the entrance opposed in a width direction thereof, and a plurality of first ground transmitters provided corresponding to the plurality of ground receivers, at least one of the plurality of first ground transmitters transmitting the second wave in response to a reception of the first wave by at least one of the plurality of ground receivers at least in a direction opposite to an entry direction of the vehicle to the predetermined area. The guide controller determines an entry line to the entrance for the vehicle based on a change of a signal level of the second wave received during the reception control performed by the reception controller, the signal level changing depending on a position of the vehicle.

According to another aspect of this disclosure, an onboard apparatus configured to be mounted at a vehicle, the onboard apparatus includes a guide controller performing a guide control for guiding the vehicle to enter a predetermined area through an entrance thereof, the predetermined area being provided on a ground, a transmission controller performing a transmission control for transmitting a first wave to an outside of the vehicle by an onboard transmitter that is configured to be mounted at the vehicle, the transmission control being performed in preparation for the guide control performed by the guide controller, and a reception controller performing a reception control for receiving a second wave by an onboard receiver that is configured to be mounted at the vehicle, the second wave being transmitted in response to the first wave from a plurality of ground transmitters at least in a direction opposite to an entry direction of the vehicle to the predetermined area, at least one of the plurality of ground transmitters being configured to be arranged at a first position and at least one of the plurality of ground transmitters being configured to be arranged at a second position, the first position and the second position corresponding to opposed ends of the entrance opposed in a width direction thereof. The guide controller determining an entry line to the entrance for the vehicle based on a change of a signal level of the second wave received during the reception control performed by the reception controller, the signal level changing depending on a position of the vehicle.

According to a further aspect of this disclosure, a ground apparatus configured to be provided on a ground, the ground apparatus includes a plurality of ground receivers at least one of which is configured to be arranged at a first position and at least one of which is configured to be arranged at a second position to receive a first wave that is transmitted to an outside of a vehicle from an onboard transmitter that is configured to be mounted at the vehicle, the first position and the second position corresponding to opposed ends of an entrance opposed in a width direction thereof, the entrance being provided at a predetermined area on the ground, and a plurality of ground transmitters provided corresponding to the plurality of ground receivers, at least one of the plurality of ground transmitters transmitting the second wave in response to a reception of the first wave by at least one of the plurality of ground receivers at least in a direction opposite to an entry direction of the vehicle to the predetermined area.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment is explained with reference to the attached drawings. Configurations of the embodiment, and effects and results derived from such configurations are examples and are not limited to descriptions below.

Figure 1:
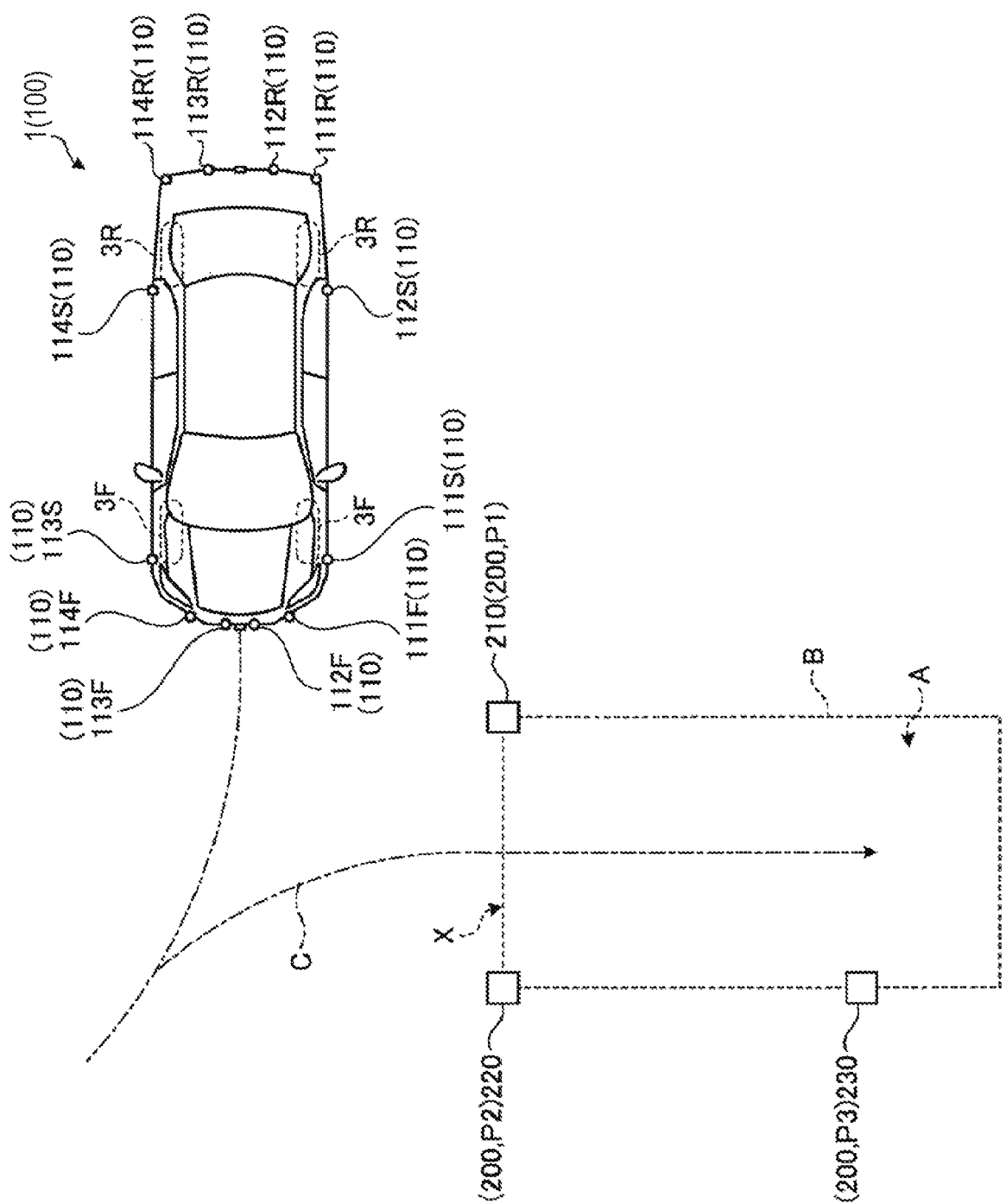
FIG. 1 is a schematic view illustrating a configuration of a vehicle guidance system according to an embodiment disclosed here.

As illustrated in FIG. 1, a vehicle guidance system according to the embodiment guides a vehicle 1 to be parked or halted in autonomous (semi-autonomous) driving within a parking area A provided on the ground that serves as a predetermined region where the vehicle is parked or halted.

As illustrated in FIG. 1, the vehicle guidance system according to the embodiment includes an onboard apparatus 100 mounted at the vehicle 1 including a pair of front wheels 3F and a pair of rear wheels 3R, and a ground apparatus 200 provided on the ground.

The onboard apparatus 100 is mounted inside the vehicle 1 so as to serve as an electronic control unit (ECU) corresponding to a microcomputer that includes the same or similar hardware for a typical computer, such as a central processing unit and memory, for example. The onboard apparatus 100 brings the vehicle 1 to be parked within the parking area A in autonomous (semi-autonomous) driving along a path C illustrated in FIG. 1, for example, by plural object detection devices 110 provided along an exterior of the vehicle 1.

As illustrated in FIG. 1, for example, the plural object detection devices 110 include four object detection devices 111F, 112F, 113F, and 114F provided at a front end part of the vehicle 1, four object detection devices 111R, 112R, 113R, and 114R provided at a rear end part of the vehicle 1, two object detection devices 111S and 112S provided at a left end part of the vehicle 1, and two object detection devices 113S and 114S provided at a right end part of the vehicle 1. The object detection devices 110 detect information related to an object positioned in surroundings of the vehicle 1 including a distance thereto by transmitting and receiving ultrasonic waves.

According to the present embodiment, arrangements and the number of object detection devices 110 are not limited to those illustrated in FIG. 1 and may be appropriately specified and changed.

The ground apparatus 200 is placed at a boundary B (i.e., a rectangle indicated with a broken line in FIG. 1) of the parking area A. The ground apparatus 200 includes guide devices 210 and 220 provided respectively at positions P1 and P2 at the boundary B of the parking area A, and a stopper device 230 provided at a position P3 at the boundary B of the parking area A.

The positions P1 and P2 serve as a first position and a second position corresponding to opposed end points of an entrance X that is provided at an end portion of the boundary B at a side where the vehicle 1 enters (i.e., a short side positioned at an upper side of the rectangle indicated with the broken line in FIG. 1). The entrance X may be provided at other position than the aforementioned end portion of the boundary B of the parking area A. The position P3 serves as a third position at the boundary B of the parking area A away from the position P2 by a predetermined distance in a direction where the vehicle 1 enters the parking area A (i.e., an entry direction of the vehicle 1, refer to an arrow of an end of the path C illustrated in FIG. 1). The position P3 is specified as a position configured to be opposed to the object detection device 112S of the vehicle 1 in a state where the vehicle 1 is positioned within the parking area A (see FIG. 6).

In FIG. 1, the positions P1, P2, and P3 are all provided on the boundary B of the parking area A. The positions P1, P2, and P3 are not limited to be provided on the boundary B. Each of the positions P1, P2, and P3 may be provided at any portion in the vicinity of the boundary B of the parking area A.

According to a known technique, information obtained on a basis of an image of surroundings of a vehicle that is acquired by an onboard camera is provided to guide the vehicle to a predetermine area.

The information included in the image usually varies depending on brightness in environment where the image is captured. In a case where a vehicle is guided using the aforementioned technique in autonomous (semi-autonomous) driving, for example, accuracy in guiding the vehicle may vary depending on environment.

Figure 2:
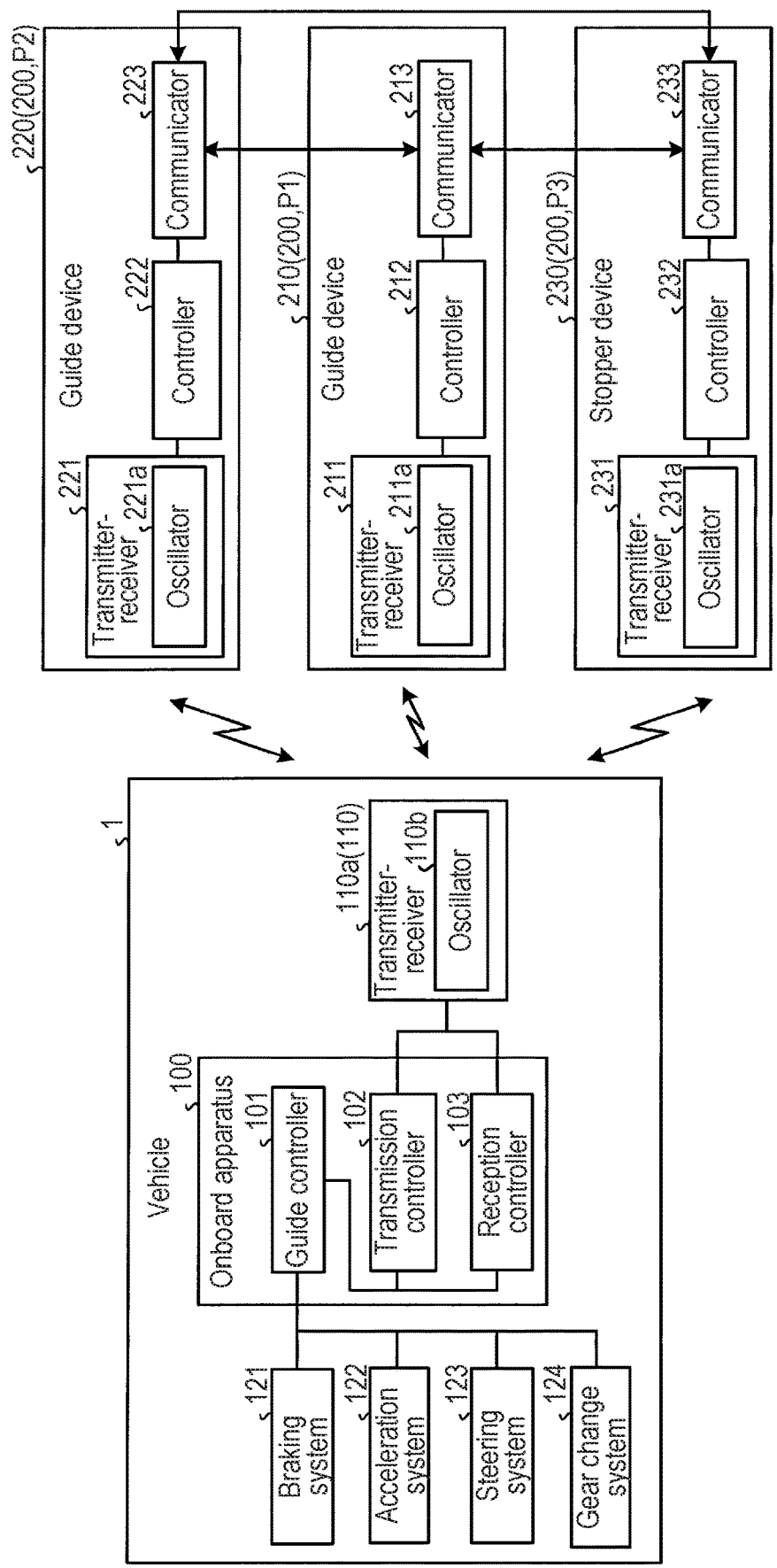
FIG. 2 is a block diagram illustrating configurations of an onboard apparatus and a ground apparatus according to the embodiment.

The vehicle guidance system according to the present embodiment enables the vehicle 1 to be accurately guided with no influence of environment in a state where the onboard apparatus 100 mounted at the vehicle 1 and the ground apparatus 200 provided on the ground operate together while including functions as illustrated in FIG. 2 (or hardware).

As illustrated in FIG. 2, in the present embodiment, the ground apparatus 200 includes the guide devices 210, 220, and the stopper device 230.

A construction of the onboard apparatus 100 is explained below.

As illustrated in FIG. 2, the onboard apparatus 100 includes a guide controller 101, a transmission controller 102, and a reception controller 103. The guide controller 101, the transmission controller 102, and the reception controller 103 may be partially or fully achieved functionally by co-operation of hardware and software, specifically, by a processor of an ECU reading and executing program stored at a memory, or achieved by hardware such as an exclusive circuit, for example.

The guide controller 101 controls a driving control system controlling driving of the vehicle 1 to achieve autonomous (semi-autonomous) driving of the vehicle 1. The driving control system includes a braking system 121 controlling braking of the vehicle 1, an acceleration system 122 controlling acceleration of the vehicle 1, a steering system 123 controlling steering of the vehicle 1, and a gear change system 124 controlling gear change of the vehicle 1, for example. The guide controller 101 controls such systems to perform a guide control for guiding the vehicle 1 to enter the parking area A from the entrance X as illustrated in FIG. 1. The guide control is started and triggered by the driver's start operation.

The transmission controller 102 and the reception controller 103 control transmission and reception of ultrasonic waves by transmitter-receivers 110a provided at the respective object detection devices 110. Each of the transmitter-receivers 110a is provided as a device for transmitting and receiving the ultrasonic wave. The transmitter-receiver 110a serves as an example of a first transmitter-receiver.

The transmitter-receiver 110a includes a single oscillator 110b including a piezoelectric element, for example, that oscillates to receive and transmit ultrasonic waves. The oscillator 110b serves as an example of a first oscillator. The transmitter-receiver 110a is thus constructed to integrally include an onboard transmitter that transmits the ultrasonic wave from the vehicle 1 and an onboard receiver that receives the ultrasonic wave at the vehicle 1.

In the present embodiment, the onboard transmitter and the onboard receiver are integrally provided as the single transmitter-receiver 110a. Alternatively, the onboard transmitter and the onboard receiver may be separately provided from each other as separate devises.

The guide devices 210, 220, and the stopper device 230 of the ground apparatus 200 are explained below.

The guide device 210 includes a transmitter-receiver 211, a controller 212, and a communicator 213. The guide device 220 includes a transmitter-receiver 221, a controller 222, and a communicator 223. The stopper device 230 includes a transmitter-receiver 231, a controller 232, and a communicator 233. Each of the transmitter-receivers 211, 221, and 231 serves as an example of a second transmitter-receiver.

Components having identical names include the same functions and operations. In the following, the construction of the guide device 210 of the ground apparatus 200 provided at the position P1 illustrated in FIG. 1 is explained as an example.

The transmitter-receiver 211 includes a single oscillator 211a including a piezoelectric element, for example, that oscillates to receive and transmit ultrasonic waves. The transmitter-receiver 211 is thus constructed to integrally include a ground transmitter that transmits the ultrasonic wave from the ground and a ground receiver that receives the ultrasonic wave at the ground. The ground transmitter and the ground receiver may be provided separately from each other as separate devices.

The oscillator 211a of the transmitter-receiver 211 of the guide device 210 and an oscillator 221a of the transmitter-receiver 221 of the guide device 220 transmit transmission waves serving as ultrasonic waves. The transmission wave from the oscillator 211a has a peak signal level in the same direction as a direction of a peak signal level of the transmission wave from the oscillator 221a. Each of the oscillators 211a and 221a serves as an example of a second oscillator. The oscillator 231a of the transmitter-receiver 231 of the stopper device 230 transmits a transmission wave (ultrasonic wave) having a peak signal level in a direction different from the transmission waves from the oscillators 211a and 221a. Thus, each of the transmitter-receivers 211 and 221 serves as an example of a first ground transmitter and the transmitter-receiver 231 serves as an example of a second ground transmitter in terms of the function as the ground transmitter.

The controller 212 controls the guide device 210. The controller 212 controls transmission and reception of ultrasonic waves performed by the transmitter-receiver 211 and communication performed by the communicator 223, for example.

The communicator 213 of the guide device 210 is an interface that achieves communication with the other devices of the ground apparatus 200, i.e., the guide device 220 and the stopper device 230. To avoid interference with transmission and reception of ultrasonic waves performed by the transmitter-receiver 211, for example, the communication of the communicator 213 is achieved by transmission and reception of electromagnetic waves using Bluetooth (registered trademark) and Wi-Fi (registered trademark), for example, different from ultrasonic waves.

According to the present embodiment, the guide devices 210, 220, and the stopper device 230 of the ground apparatus 200 are communicable with one another. Thus, the ground apparatus 200 is controllable in a manner that one of the aforementioned devices 210 to 230 serves as a master and the others serve as slaves.

According to the present embodiment, the guide control is achieved as explained below by cooperation between the onboard apparatus 100 and the ground apparatus 200 including the aforementioned constructions.

Figure 3:
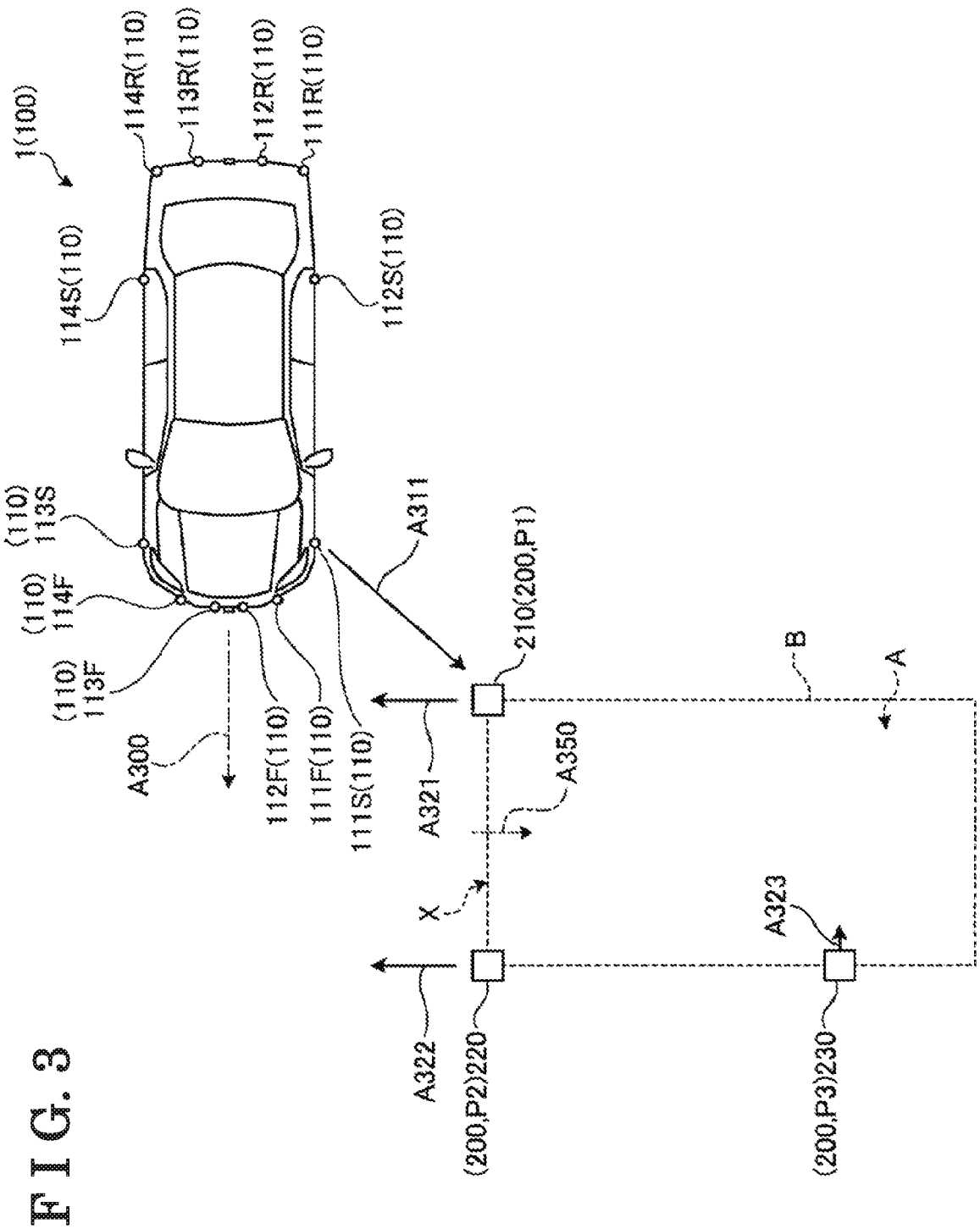
FIG. 3 is a schematic view explaining a transmission control performed by the onboard apparatus according to the embodiment.

The transmission controller 102 of the onboard apparatus 100 performs a transmission control for transmitting transmission waves (first waves, ultrasonic waves) to the outside of the vehicle 1 via the transmitter-receivers 110a as illustrated in FIG. 3 in preparation for the guide control performed by the guide controller 101.

As illustrated in FIG. 3, the transmission control is performed in a case where the vehicle 1 is driven along an arrow A300 to approach the parking area A at a low speed, for example.

In the transmission control, the transmission controller 102 of the onboard apparatus 100 controls all the object detection devices 110 provided at the exterior of the vehicle 1 to transmit the transmission waves (first waves). The transmission wave from at least one of the plural object detection devices 110 is thus received by at least one of the plural devices 210, 220, and 230 of the ground apparatus 200. For example, as illustrated in FIG. 3, the transmission wave from the object detection device 111S provided at a left end portion of the vehicle 1 reaches the guide device 210 provided closest to the vehicle 1 among the plural devices 210, 220, and 230 of the ground apparatus 200.

In FIG. 3, the transmission wave from the object detection device 111S seems to have directionality in a single direction (i.e., along an arrow A311). In fact, the transmission wave from the object detection device 111S is transmittable while spreading or expanding to a certain area. This is also applicable to the transmission wave transmitted from the ground apparatus 200 explained below.

The guide device 210 that has received the aforementioned transmission wave (the first wave) from the vehicle 1 transmits a transmission wave (a second wave) in response to the first wave, the second wave having a peak signal level in a direction opposite to an entry direction A350 of the vehicle 1 to the parking area A, i.e., along an arrow A321. At this time, the guide device 210 transmits predetermined information (command) to the guide device 220 and the stopper device 230 of the ground apparatus 200 via the communicator 213 to cause each of the guide device 220 and the stopper device 230 to also transmit a certain transmission wave.

Specifically, the guide device 220 transmits the transmission wave (the second wave) having a peak signal level in an opposite direction from the entry direction A350 of the vehicle 1 to the parking area A (i.e., along an arrow A322) in response to the aforementioned predetermined command from the guide device 210. The stopper device 230 also transmits a transmission wave (a third wave) having a peak signal level in a direction inward the parking area A and orthogonal to the entry direction A350 of the vehicle 1 to the parking area A (i.e., along an arrow A323) in response to the aforementioned predetermined command from the guide device 210.

The reception controller 103 of the onboard apparatus 100 performs a reception control for receiving transmission waves (ultrasonic waves) from the ground apparatus 200. At this time, the transmission controller 102 may tentatively stop transmission of transmission waves from the object detection devices 110 provided at the onboard apparatus 100 so that the object detection devices 110 are exclusively used as receivers.

For example, in FIG. 3, the respective transmitter-receivers 110a of the object detection devices 111S and 112S provided at the onboard apparatus 100 serve exclusively as receivers while transmission of transmission waves from the object detection devices 111S and 112S is being stopped. The transmission waves from the ground apparatus 200 are securely receivable accordingly. The aforementioned stop of the transmission waves from the object detection devices 110 is triggered by the driver's start operation of the guide control, for example.

Figure 4:
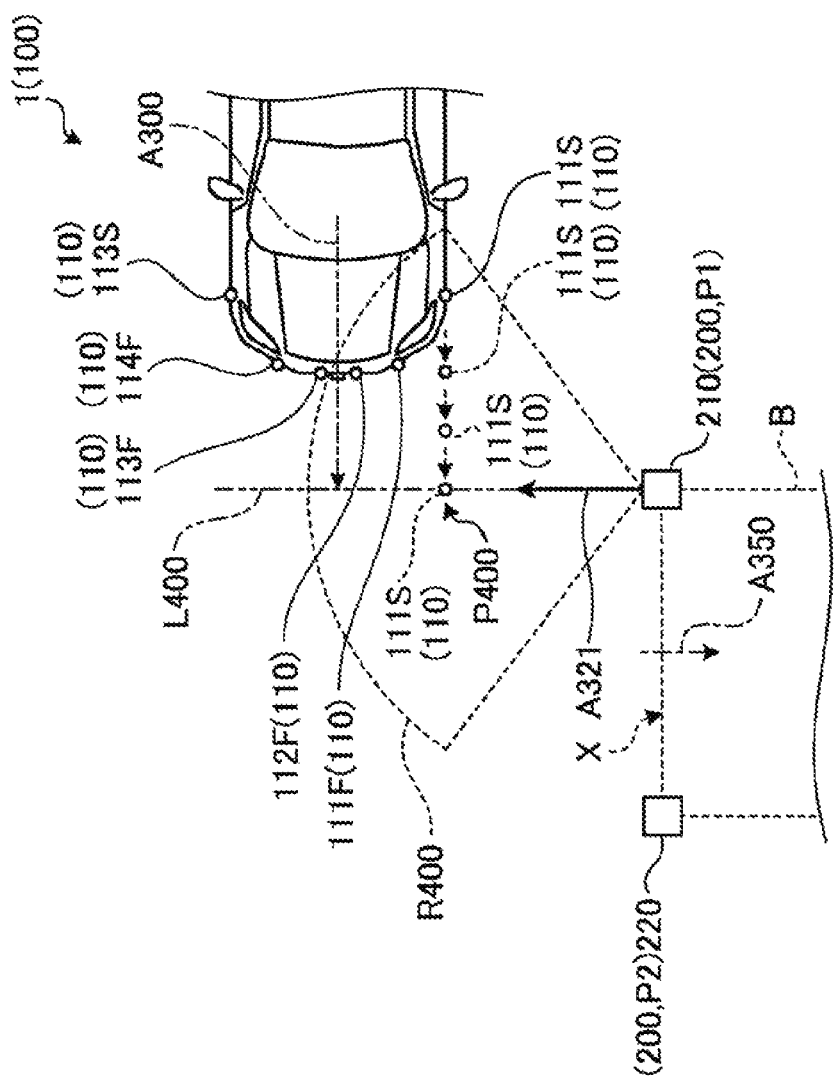
FIG. 4 is a schematic view explaining a reception control performed by the onboard apparatus according to the embodiment.

The signal level of the transmission wave from the ground apparatus 200 when such transmission wave is received at the vehicle 1 during the reception control changes depending on the position of the vehicle 1 as illustrated in FIG. 4, for example.

As illustrated in FIG. 4, the guide device 210 transmits a transmission wave within a range indicated with a broken line R400, the range expanding from the position P1, for example. Specifically, the guide device 210 transmits the transmission wave in any direction from the position P1 including a direction of the arrow A321 serving as a direction opposite to the entry direction A350 of the vehicle 1 to the parking area A. The onboard apparatus 100 receives the transmission wave from the guide device 210 by the object detection device 111S that enters to be positioned within the range indicated with the broken line R400 during the reception control.

A signal level of a reception wave received by the object detection device 111S, the reception wave serving as the transmission wave from the guide device 210, becomes stronger in a state where the vehicle 1 is driven further along the arrow A300 and the object detection device 111S and the guide device 210 approach each other. The aforementioned reception wave indicates the peak signal level when the object detection device 111S and the guide device 210 come closest to each other, specifically, the object detection device 111S reaches a position P400 on a line L400 that extends along the arrow A321 from the guide device 210.

At the time the reception wave received by the object detection device 111S shows the peak signal level, the guide device 210 is estimated to be arranged, relative to the position P400 at which the object detection device 111S is disposed, at an outer side of the vehicle 1 in a width direction thereof. In the present embodiment, the guide controller 101 of the onboard apparatus 100 may estimate a direction where the guide device 210 is disposed by detecting changes in the signal level of the transmission wave from the guide device 210 received by the object detection device 111S, specifically, by detecting the peak signal level of the transmission wave.

In the following explanation, a state where the aforementioned estimation is obtained (i.e., the guide device 210, 220 is arranged at the outer side of the vehicle 1 in the width direction thereof relative to the position of the object detection device 111S) may be described in a way that the position of the vehicle 1 corresponds to the position P1 or P2 at which the guide device 210 or 220 is arranged.

Figure 5:
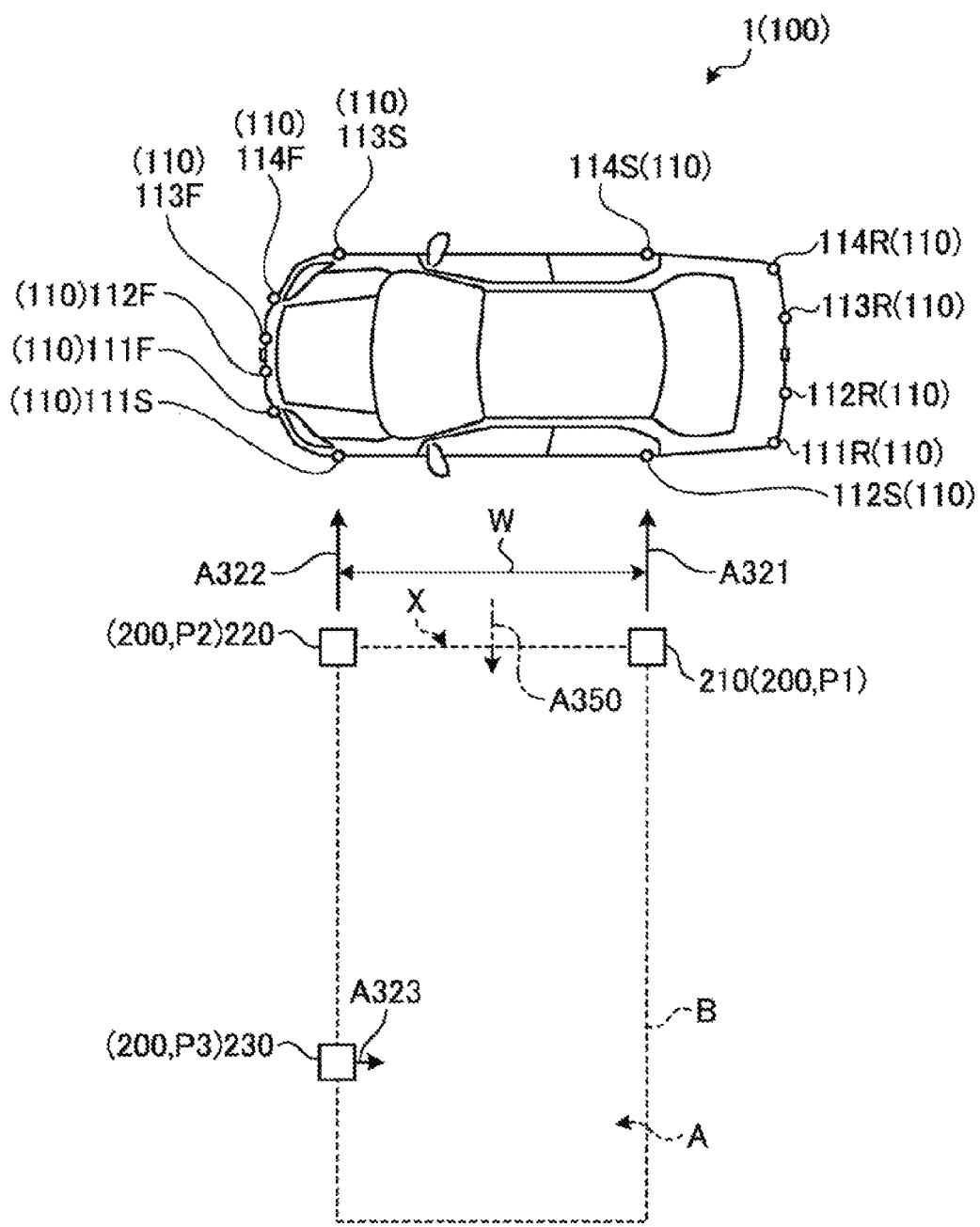
FIG. 5 is a schematic view explaining the reception control and a guide control performed by the onboard apparatus according to the embodiment.

The guide controller 101 of the onboard apparatus 100 determines an entry line to the entrance X for the vehicle 1 based on the position of the vehicle 1 obtained around timing where the transmission wave (the second wave) from each of the guide devices 210 and 220 indicates the peak signal level as illustrated in FIG. 5. The entry line indicates a position and a direction of the vehicle 1 with which the vehicle 1 is restrained from running off or deviating from opposed ends of the entrance X when the vehicle 1 enters the entrance X during the guide control.

FIG. 5 illustrates the vehicle 1 that is driven further along the arrow A300 from the states illustrated in FIGS. 3 and 4, so that the left end portion of the vehicle 1 is opposed to the entrance X.

When the vehicle 1 is further driven from the states illustrated in FIGS. 3 and 4 to the state illustrated in FIG. 5, the object detection device 111S first receives the transmission wave from the guide device 210 and thereafter receives the transmission wave from the guide device 220.

Each of the transmission waves from the guide devices 210 and 220 indicates the peak signal level in the opposite direction from the entry direction A350 of the vehicle 1 to the parking area A (i.e., along the arrows A321 and A322). Thus, during the reception control, the position of the vehicle 1 at which the reception wave received by the object detection device 111S first indicates the peak signal level corresponds to the position P1 at which the guide device 210 is arranged. Additionally, the position of the vehicle 1 at which the reception wave received by the object detection device 111S next indicates the peak signal level corresponds to the position P2 at which the guide device 220 is arranged.

The guide controller 101 of the onboard apparatus 100 specifies positions of the vehicle 1 obtained at two timings where the reception wave received by the object detection device 111S, for example, indicates the peak signal level. The guide controller thus estimates positions corresponding to the opposed ends of the entrance X. The guide controller 101 determines the entry line of the vehicle 1 to the entrance X in accordance with the estimation result of the positions corresponding to the opposed ends of the entrance X, the entry line reflecting a position or a direction of the vehicle 1 with which the vehicle 1 is inhibited from running off or deviating from the opposed ends of the entrance X upon entering the entrance X during the guide control.

The aforementioned technique where the peak signal level of the reception wave received at the vehicle 1 is taken into account is applicable not only to a case where the vehicle 1 is guided to enter the entrance X but also to a case where the vehicle 1 that has entered the parking area A is guided to be parked (or halted) at a predetermined position within the parking area A. Specifically, the reception control and the guide control according to the present embodiment are applicable to a state as illustrated in FIG. 6.

Figure 6:
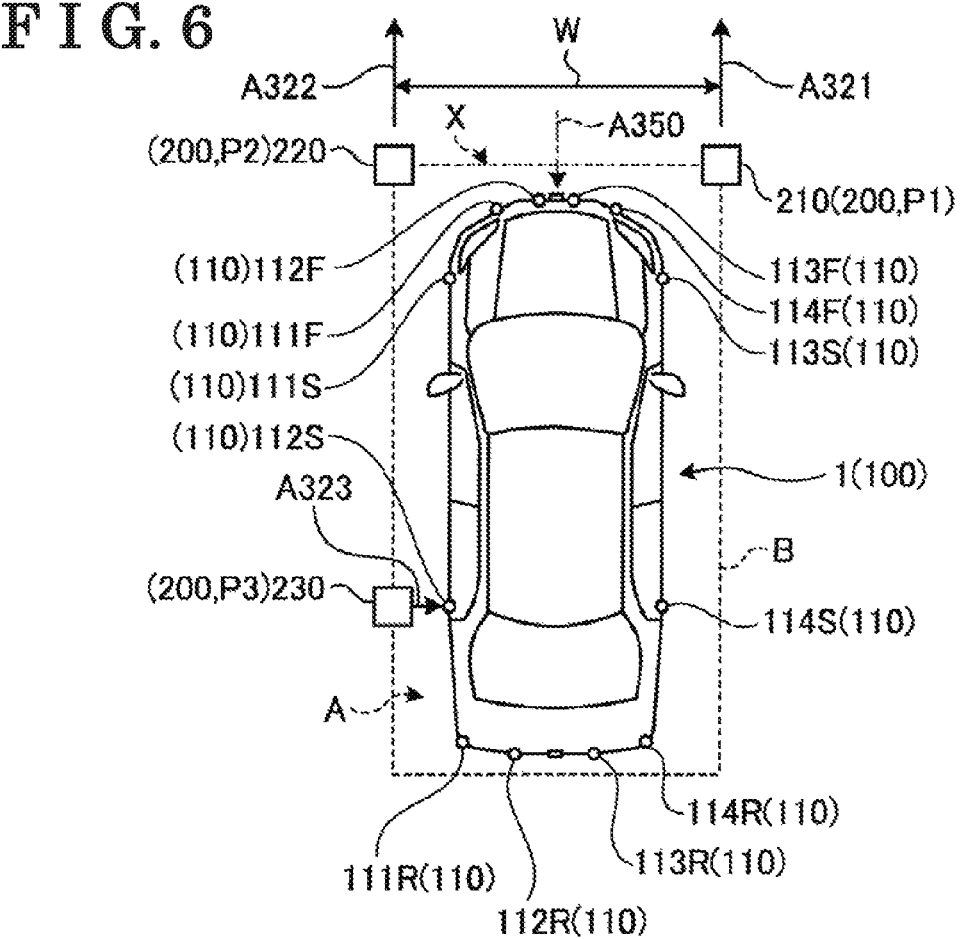
FIG. 6 is a schematic view further explaining the reception control and the guide control performed by the onboard apparatus according to the embodiment.

FIG. 6 illustrates a state where the vehicle 1 that has moved along the entry direction A350 from the entrance X is positioned within the parking area A by the guide control.

In the present embodiment, the stopper device 230 is provided at a position configured to be opposed to the object detection device 112S of the vehicle 1 that has entered within the parking area A. When the vehicle 1 reaches a position within the parking area A corresponding to the position P3 of the stopper device 230 as illustrated in FIG. 6, the reception wave received by the object detection device 112S from the stopper device 230 (see the arrow A323) indicates the peak signal level, the object detection device 112S being provided at the left end portion of the vehicle 1. The vehicle 1 may be appropriately parked within the parking area A so as not to run off (deviate from) the parking area A when the guide control is terminated at this time.

According to the present embodiment, the reception controller 103 of the onboard apparatus 100 continues the reception control after the vehicle 1 enters the parking area A. The guide controller 101 of the onboard apparatus 100 terminates the guide control around timing where the transmission wave (the third wave) from the stopper device 230 indicates the peak signal level during the reception control performed by the reception controller 103 so as to park or halt the vehicle 1.

The transmission of the transmission waves by the ground apparatus 200 is automatically terminated after an elapse of a predetermined time period.

According to the embodiment, it is important to specify timing where the reception wave received at the vehicle 1 indicates the peak signal level during the reception control. It is basically not necessary to identify the device (i.e., the guide device 210, the guide device 220, or the stopper device 230) that transmits the transmission wave resulting in the aforementioned reception wave.

Nevertheless, identifying the device from which the transmission wave is transmitted to be received as the reception wave at the vehicle 1 may achieve a secure determination that reception waves indicating peak signal levels at different timings from one another are transmitted from different devices, i.e., the guide device 210, the guide device 220, and the stopper device 230.

According to the present embodiment, the guide devices 210, 220, and the stopper device 230 transmit transmission waves in different modes from one another, i.e., in a first mode, a second mode, and a third mode. Specifically, the guide devices 210, 220, and the stopper device 230 transmit the transmission waves including the different numbers of bursts from one another. The width of the reception wave when the reception wave indicates the peak signal level, the reception wave being received at the vehicle 1 resulting from the transmission wave transmitted from the ground apparatus 200, is correlated to the number of bursts of the transmission wave from the ground apparatus 200. Appropriately adjusting the number of bursts of the transmission wave enables identification of the peak width of the reception wave and identification of the device (i.e., the guide devices 210, 220, or the stopper device 230) from which the reception wave received at the vehicle 1 is transmitted.

Figure 7:
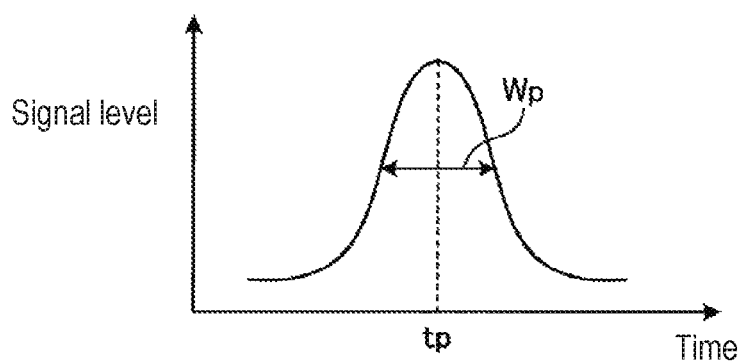
FIG. 7 is a schematic view illustrating an example of a reception wave received at a vehicle during the reception control according to the embodiment.

FIG. 7 illustrates the reception wave received at the vehicle 1, the reception wave indicating the peak signal level at timing tp and including a width Wp at the time the reception wave indicates the peak signal level.

In a case where the number of bursts of the transmission wave increases, a transmission time is elongated. This may cause the width Wp to increase. In the example illustrated in FIG. 3, for example, the number of bursts of the transmission wave from the guide device 220 provided at the position P2 away from the vehicle 1 than the position P1 is specified greater than the number of bursts of the transmission wave from the guide device 210 that first receives the transmission wave from the vehicle 1 and is provided at the position P1 closer to the vehicle 1 than the position P2. The device (i.e., the guide device 210 or 220) from which the transmission wave is transmitted is appropriately identified accordingly.

In the example illustrated in FIG. 3, the vehicle 1 receives the transmission wave from the guide device 220 later than the transmission wave from the guide device 210, the guide device 210 being positioned closer to the vehicle 1 than the guide device 220. According to the embodiment, the number of bursts of the transmission wave from the guide device 220 is specified greater than the number of bursts of the transmission wave from the guide device 210 to elongate the transmission time of the transmission wave from the guide device 220. The device (i.e., the guide device 210 or 220) from which the transmission wave is transmitted is appropriately identified accordingly.

In the same manner, the transmission wave from the stopper device 230 is received at the vehicle 1 later than the transmission waves from the guide devices 210 and 220. Thus, the number of bursts of the transmission wave from the stopper device 230 is specified greater than the number of bursts of the transmission wave from each of the guide devices 210 and 220. The device (i.e., the guide device 210, 220, or the stopper device 230) from which the transmission wave is transmitted is appropriately identified accordingly.

In the above, the number of bursts of the transmission wave from the guide device 220 is specified greater than the guide device 210. Nevertheless, in a case where the guide device 220 first receives the transmission wave from the vehicle 1, a magnitude relation of the number of bursts between the guide devices 210 and 220 is opposite to the aforementioned relation. The number of bursts may be appropriately adjusted depending on which device of the ground apparatus 200 first receives the transmission wave from the vehicle 1.

Figure 8:
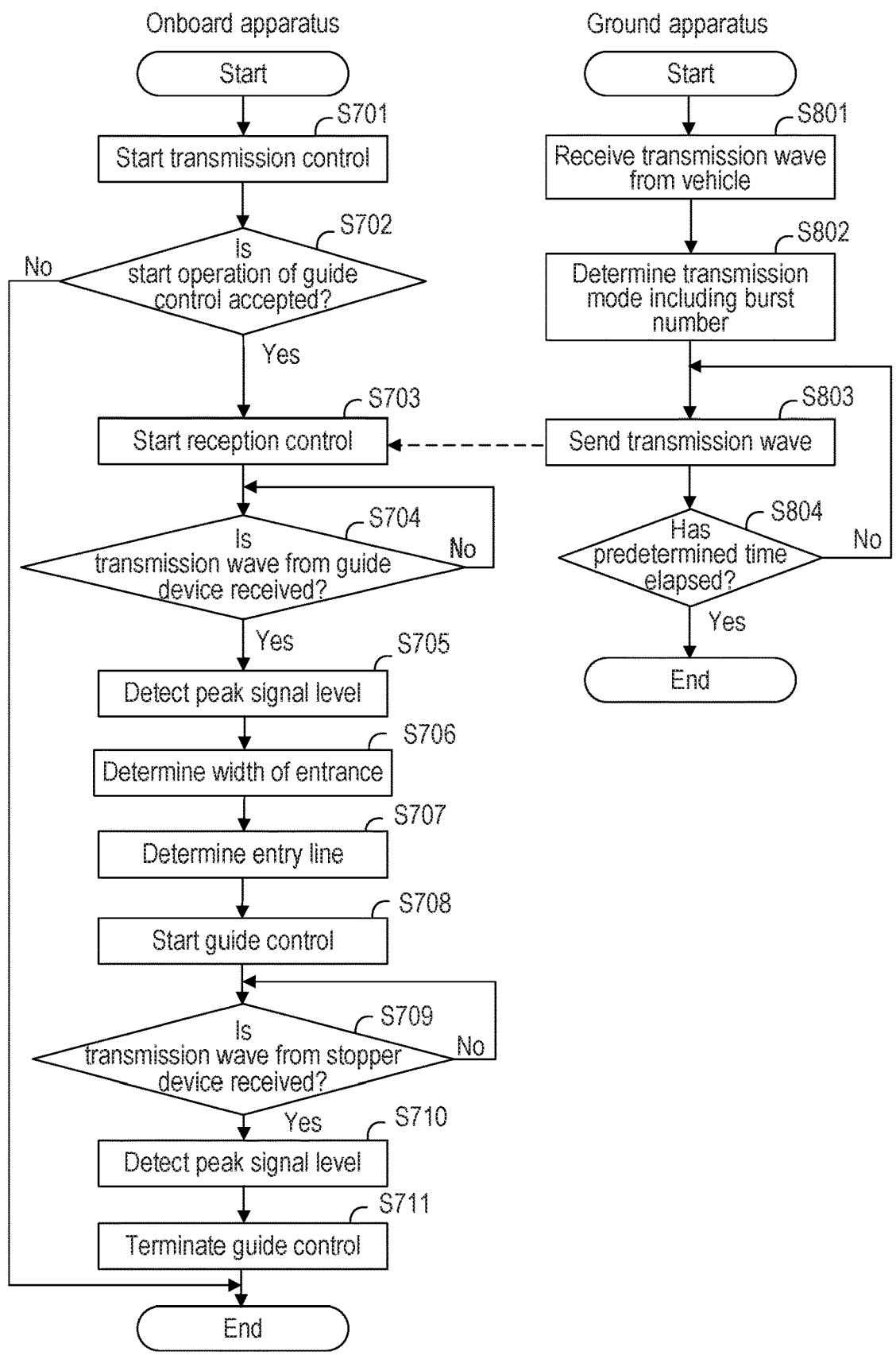
FIG. 8 is a flowchart illustrating a processing executed by the onboard apparatus and the ground apparatus according to the embodiment.

The onboard apparatus 100 and the ground apparatus 200 including the aforementioned constructions operate together in accordance with a flowchart illustrated in FIG. 8.

As illustrated in FIG. 8, The transmission controller 102 of the onboard apparatus 100 starts the transmission control for transmitting the transmission waves serving as ultrasonic waves by the transmitter-receivers 110a of the respective object detection devices 110 at S701. The transmission control is started or triggered by the speed of the vehicle 1 falling to or below a predetermined speed, for example.

At S801, one of the controllers 212, 222, and 232 of the ground apparatus 200 positioned closest to the vehicle 1 controls the corresponding transmitter-receiver 211, 221, or 231 to receive the transmission wave (ultrasonic wave) transmitted from the vehicle 1 at S701.

One of the controllers 212, 222, and 232 of the ground apparatus 200 having performed the operation at S801 determines respective transmission modes (i.e., the first, second, and third modes) for the transmitter-receivers 211, 221, and 231 of the guide devices 210, 220, and the stopper device 230 at S802. Each of the transmission modes includes the number of bursts of the transmission wave transmitted from the corresponding transmitter-receiver 211, 221, or 231. The transmission modes for the transmitter-receivers 211, 221, and 231 are determined differently from one another. The transmission modes determined at S802 are shared among the devices 210, 220, and 230 via communication performed by the communicators 213, 223, and 233.

At S803, the controllers 212, 222, and 232 of the ground apparatus 200 control the corresponding transmitter-receivers 211, 221, 231 to transmit the transmission waves serving as the ultrasonic waves in the respective transmission modes determined at S802.

The controllers 212, 222, and 232 of the ground apparatus 200 determine whether a predetermined time has elapsed at S804.

In a case where it is determined that the predetermined time has not elapsed at S804, the processing returns to S803. In a case where it is determined that the predetermined time has elapsed at S804, the processing is terminated.

According to the present embodiment, the ground apparatus 200 transmits the transmission waves for the predetermined time in response to the reception of the transmission waves from the onboard apparatus 100. The subsequent operation of the ground apparatus 200 is automatically terminated.

When the transmission control is started at S701, the guide controller 101 of the onboard apparatus 100 receives the driver's start operation of the guide control.

The guide controller 101 of the onboard apparatus 100 determines whether the start operation of the guide control is accepted at S702.

In a case where it is determined that the start operation is not accepted at S702, the processing is terminated. In a case where it is determined that the start operation is accepted at S702, the processing moves to S703 in preparation for the guide control.

At S703, the reception controller 103 of the onboard apparatus 100 starts the reception control for receiving the transmission waves transmitted from the ground apparatus 200 at S803. At this time, the transmission control using the transmitter-receivers 110a of the object detection devices 110 provided at the onboard apparatus 100 may be stopped as mentioned above.

At S704, the guide controller 101 of the onboard apparatus 100 determines whether the transmission waves from the guide devices 210 and 220 are received at the vehicle 1 in the reception control that has started at S703.

The operation at S704 is repeated until the transmission waves from the guide devices 210 and 220 are received at the vehicle 1. In a case where it is determined that the transmission waves from the guide devices 210 and 220 are received at the vehicle 1 at S704, the processing moves to S705.

The guide controller 101 of the onboard apparatus 100 detects the peak signal level of the transmission wave from each of the guide devices 210 and 220 which are received in the reception control at S705.

At S706, the guide controller 101 of the onboard apparatus 100 determines the width of the parking area A based on the detection result at S705. Specifically, the guide controller 101 specifies positions of the vehicle 1 obtained around two timings where each of the transmission waves from the guide devices 210 and 220 indicates the peak signal level and specifies positions corresponding to the opposed ends of the entrance X serving as information for determining the width of the parking area A.

The guide controller 101 of the onboard apparatus 100 determines the entrance line to the entrance X based on the result obtained at S706. The entrance line includes the position and the direction of the vehicle 1 with which the vehicle 1 is inhibited from running off or deviating from the opposed ends of the entrance X when the vehicle 1 is guided to move through the entrance X during the guide control at S707.

At S708, the guide controller 101 of the onboard apparatus 100 starts to control all of or part of the braking system 121, the acceleration system 122, the steering system 123, and the gear change system 124 so that the vehicle 1 enters the entrance X along the entry line determined at S707.

At S709, the guide controller 101 of the onboard apparatus 100 determines whether the transmission wave from the stopper device 230 is received in the reception control that has started at S703.

The operation at S709 is repeated until the reception of the transmission wave from the stopper device 230 is determined. When it is determined that the transmission wave from the stopper device 230 is received at S709, the processing moves to S710.

The guide controller 101 of the onboard apparatus 100 detects the peak signal level of the transmission wave from the stopper device 230 received during the reception control at S710. Specifically, the guide controller 101 specifies timing where the transmission wave from the stopper device 230 indicates the peak signal level.

At S711, the guide controller 101 of the onboard apparatus 100 terminates the guide control so that the vehicle 1 is stopped around the timing where the transmission wave from the stopper device 230 indicates the peak signal level in accordance with the detection result at S710. The vehicle 1 is appropriately parked within the parking area A accordingly and the present processing is terminated.

The vehicle guidance system according to the present embodiment includes the onboard apparatus 100 mounted at the vehicle 1 and the ground apparatus 200 provided on the ground and including the guide devices 210 and 220. The onboard apparatus 100 includes the guide controller 101, the transmission controller 102, and the reception controller 103. The guide devices 210 and 220 include the transmitter-receivers 211 and 221, respectively, each of the transmitter-receivers 211 and 221 integrally incorporating the function as the ground receiver and the ground transmitter.

The guide controller 101 performs the guide control for guiding the vehicle 1 to enter the parking area A serving as the predetermined area provided on the ground through the entrance X positioned at the end of the parking area A. The transmission controller 102 performs the transmission control for transmitting the first wave to the outside of the vehicle 1 by the transmitter-receiver 110a serving as the onboard transmitter mounted at the vehicle 1 in preparation for the guide control performed by the guide controller 101. The reception controller 103 performs the reception control for receiving the second wave in response to the first wave by the transmitter-receiver 110a serving as the onboard receiver mounted at the vehicle 1.

At least one transmitter-receiver (i.e., transmitter-receiver 211, 221) is provided at each of the positions P1 and P2 corresponding to the opposed ends of the entrance X in the width direction thereof for receiving the first wave. At least one of the transmitter-receivers 211 and 221 transmits the second wave in response to the reception of the aforementioned first wave in a manner that the second wave indicates the peak signal level in the direction opposite to the entry direction of the vehicle 1 to the parking area A.

The guide controller 101 determines the entry line to the entrance X for the vehicle 1 based on the position of the vehicle 1 around the timing where the aforementioned second wave received during the reception control by the reception controller 103 indicates the peak signal level.

The aforementioned construction according to the embodiment enables detection of positions corresponding to the opposed ends of the entrance in the width direction to determine the appropriate entry line using transmission and reception results of the first wave and the second wave, without using an image that may be influenced by environment, for example. The vehicle 1 may be thus accurately guided to the parking area A without being influenced by environment. In addition, the detection of the peak signal level of the second wave that is received during the reception control enables easy detection of positions corresponding to the opposed ends of the entrance X in the width direction.

In the present embodiment, the transmitter-receiver 211 configured to be arranged at the first position P1 transmits the second wave in the first mode and the transmitter-receiver 221 configured to be arranged at the second position P2 transmits the second wave in the second mode, the first mode and the second mode being different from each other. The guide controller 101 determines the entry line based on two positions of the vehicle 1 obtained around respective (i.e., two) timings where the second wave transmitted in the first mode indicates a peak signal level and the second wave transmitted in the second mode indicates a peak signal level. The aforementioned construction enables identification between the second wave transmitted from the position P1 and the second wave transmitted from the position P2. The peak signal level of the second wave transmitted from the position P1 and the peak signal level of the second wave transmitted from the position P2 are easily detectable accordingly.

Specifically, as illustrated in FIG. 3, for example, the transmitter-receiver 221 of the guide device 220 provided away from the vehicle 1 than the transmitter-receiver 211 of the guide device 210 that first receives the first wave transmits the second wave including the greater number of bursts than the second wave transmitted by the transmitter-receiver 211 of the guide device 210. The transmission time of the second wave transmitted by the transmitter-receiver 221 of the guide device 220 provided away from the vehicle 1 is thus longer than the transmission time of the second wave transmitted by the transmitter-receiver 211 of the guide device 210 provided closer to the vehicle 1. The second wave transmitted from the transmitter-receiver 221 of the guide device 220 positioned away from the vehicle 1 may be securely received at the vehicle 1.

The number of bursts of the second wave transmitted by the guide device 210 and the number of bursts of the second wave transmitted by the guide device 220 are determinable on a basis of communication between the guide devices 210 and 220. The transmission timing of the second wave by the guide device 210 and the transmission timing of the second wave by the guide device 210 are adjustable to be the same as each other, for example, in accordance with the communication between the guide devices 210 and 220.

The ground apparatus 200 includes the stopper device 230 arranged in the vicinity of the boundary B of the parking area A and positioned at the position P3 away from one of the positions P1 and P2 in the entry direction of the vehicle 1 to the parking area A. The stopper device 230 transmits the third wave being orthogonal to the entry direction of the vehicle 1 to the parking area A and showing the peak signal level in the direction inward the parking area A in response to the transmission of the second waves from the guide devices 210 and 220. The reception controller 103 receives the third wave in the reception control. The guide controller 101 terminates the guide control so that the vehicle 1 is parked around the timing where the third wave indicates the peak signal level in the reception control performed by the reception controller 103. The vehicle 1 is appropriately parked or halted within the parking area A using the third wave accordingly.

According to the embodiment, the transmitter-receiver 231 of the stopper device 230 transmits the third wave in a different mode from the second waves transmitted from the transmitter-receivers 211 and 221 of the guide devices 210 and 220. The second wave and the third wave are identifiable therebetween, so that the peak signal level of the third wave is easily detectable.

Specifically, the transmitter-receiver 231 of the stopper device 230 transmits the third wave including the greater number of bursts than that of the second wave. The third wave from the transmitter-receiver 231 of the stopper device 230 is thus securely receivable at the vehicle 1.

The aforementioned embodiment is achieved with transmission and reception of ultrasonic waves. Alternatively, the embodiment is achievable with transmission and reception of sound waves, millimeter waves, and electromagnetic waves, for example.

In the embodiment, the single guide device is provided at the position corresponding to each of the opposed ends of the entrance of the parking area, i.e., two guide devices of the ground apparatus are provided. The stopper device of the ground apparatus is provided at the position away from one of the two guide devices by a predetermined distance in the entry direction of the vehicle. The number of guide devices is not limited to two in total. In a modified example, at least one guide device is provided at each of the positions corresponding to the opposed ends of the entrance. Additionally, the number of stopper devices is not limited to one. In a modified example, at least one stopper device is provided at the position away from each of the two guide devices, i.e., two stopper devices in total may be provided away from the respective two guide devices, by a predetermined distance in the entry direction of the vehicle.

In the embodiment, the transmission wave from the guide device of the ground apparatus indicates the peak signal level in the direction opposite to the entry direction of the vehicle to the parking area. Additionally, the transmission wave from the stopper device of the ground apparatus indicates the peak signal level in the direction inward the parking area and orthogonal to the entry direction of the vehicle to the parking area. Alternatively, the ground apparatus according to the present embodiment may transmit the transmission wave including the peak signal level in any mode (i.e., in any direction) in a state where the vehicle is able to identify the position where the ground apparatus is provided.

Figure 9:
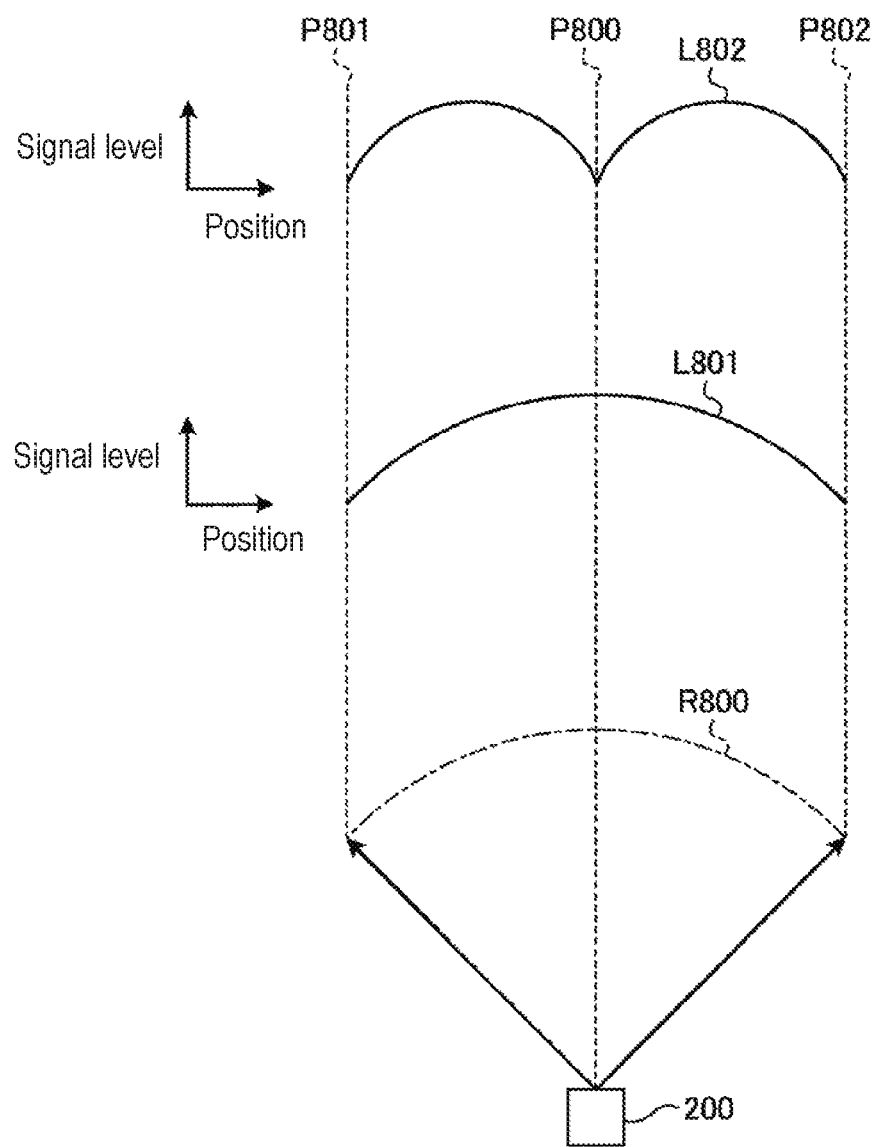
FIG. 9 is a schematic view illustrating an example of a signal level of a transmission wave from the ground apparatus according to a modified example.

For example, according to the embodiment, the ground apparatus may transmit the transmission wave including the signal level that is specified as illustrated in FIG. 9.

As illustrated in FIG. 9, the ground apparatus 200 arranged at a position P800 transmits the transmission wave in a direction within a range R800 between a position P801 and a position P802.

In FIG. 9, a continuous line L801 indicating the signal level of the transmission wave is specified substantially in the same manner as in the aforementioned embodiment. Specifically, the transmission wave according to the continuous line L801 indicates the peak signal level at a position corresponding to the position P800 at which the ground apparatus 200 is mounted. The signal level decreases from the position corresponding to the position P800 towards positions corresponding to the positions P801 and P802 arranged at opposed sides of the position P800.

The peak signal level of the transmission wave specified as in the continuous line L801 is detected to identify the position thereon corresponding to the position P800 at which the ground apparatus 200 is mounted. The same result as the aforementioned embodiment is obtainable accordingly.

On the other hand, according to a continuous line L802 indicating the signal level of the transmission wave in FIG. 9, such transmission wave indicates the peak signal level at two positions between the position P800 at which the ground apparatus 200 is mounted and the position P801 and between the position P800 and the position P802. The signal level of the transmission wave decreases at positions corresponding to the positions P800, P801, and P802.

According to the transmission wave specified as in the continuous line L802, falling of the signal level after the first peak signal level appears is detected to identify a position corresponding to the position P800 at which the ground apparatus 200 is mounted. The same result as the aforementioned embodiment is also obtainable accordingly.

In a case where the signal level of the transmission wave from the ground apparatus is specified in any mode, the same result as the aforementioned embodiment is obtainable accordingly.

Specifically, the guide controller appropriately determines the entry line of the vehicle to the parking area in a case where at least the transmission wave from the guide device is transmitted in the direction opposite to the entry direction of the vehicle to the parking area, in accordance with the change of the signal level of the transmission wave from the guide device, the signal level changing depending on the position of the vehicle. Additionally, the guide controller appropriately determines timing to terminate the guide control for parking the vehicle in a case where the transmission wave from the stopper device is transmitted in the direction inwards the parking area and orthogonal to the entry direction of the vehicle to the parking region, in accordance with the change of the signal level of the transmission wave from the stopper device, the signal level changing depending on the position of the vehicle.

The embodiment and the modified examples thereof are not limited to include the aforementioned configurations. Omissions, replacements, and changes may be appropriately conducted for the embodiment and the modified examples thereof, for example.

According to the embodiment, a vehicle guidance system includes an onboard apparatus 100 configured to be mounted at a vehicle 1, and a ground apparatus 200 configured to be provided on a ground. The onboard apparatus 100 includes a guide controller 101 performing a guide control for guiding the vehicle 1 to enter a predetermined area A through an entrance X thereof, the predetermined area A being provided on the ground, a transmission controller 102 performing a transmission control for transmitting a first wave to an outside of the vehicle 1 by a transmitter-receiver (an onboard transmitter) 110*a* that is configured to be mounted at the vehicle 1, the transmission control being performed in preparation for the guide control performed by the guide controller 101, and a reception controller 103 performing a reception control for receiving a second wave obtained in response to the first wave by the transmitter-receiver (an onboard receiver) 110*a* that is configured to be mounted at the vehicle 1. The ground apparatus 200 includes transmitter-receivers (a plurality of ground receivers) 211, 221 at least one of which is configured to be arranged at a position (first position) P1 and at least one of which is configured to be arranged at a position (second position) P2 to receive the first wave, the first position P1 and the second position P2 corresponding to opposed ends of the entrance X opposed in a width direction thereof, and the transmitter-receivers (a plurality of first ground transmitters) 211, 221 provided corresponding to the plurality of ground receivers 211, 221, at least one of the plurality of first ground transmitters transmitting the second wave in response to a reception of the first wave by at least one of the plurality of ground receivers 211, 221 at least in a direction opposite to an entry direction of the vehicle 1 to the predetermined area A. The guide controller 101 determines an entry line to the entrance X for the vehicle 1 based on a change of a signal level of the second wave received during the reception control performed by the reception controller 103, the signal level changing depending on a position of the vehicle 1.

The aforementioned construction enables detection of positions corresponding to the opposed ends of the entrance X in the width direction to determine the appropriate entry line using transmission and reception results of the first wave and the second wave without using an image that may be influenced by environment, for example. The vehicle 1 may be thus accurately guided to the predetermined area A without being influenced by environment.

According to the embodiment, each of the plurality of first ground transmitters 211, 221 transmits the second wave that indicates a peak signal level in the direction opposite to the entry direction of the vehicle 1 to the predetermined area A. The guide controller 101 determines the entry line to the entrance X based on a position of the vehicle 1 obtained at timing where the second wave that is received during the reception control performed by the reception controller 103 indicates a peak signal level.

The detection of the peak signal level of the second wave that is received enables easy detection of positions corresponding to the opposed ends of the entrance X in the width direction.

According to the embodiment, at least one of the plurality of first ground transmitters 211, 221 configured to be arranged at the first position P1 transmits the second wave in a first mode and at least one of the plurality of first ground transmitters 211, 221 configured to be arranged at the second position P2 transmits the second wave in a second mode, the first mode and the second mode being different from each other. The guide controller 101 determines the entry line based on two positions of the vehicle 1 obtained at respective timings where the second wave transmitted in the first mode indicates a peak signal level and the second wave transmitted in the second mode indicates a peak signal level.

The aforementioned construction enables identification between the second wave transmitted from the first position P1 and the second wave transmitted from the second position P2. The peak signal level of the second wave transmitted from the first position P1 and the peak signal level of the second wave transmitted from the second position P2 are easily detectable accordingly.

According to the embodiment, at least one of the plurality of first ground transmitters 211, 221 being inhibited from corresponding to one of the plurality of ground receivers 211, 221 that first receives the first wave transmits the second wave including the greater number of bursts than the second wave transmitted by at least one of the plurality of first ground transmitters 211, 221 provided corresponding to the one of the plurality of ground receivers 211, 221 that first receives the first wave.

The transmission time of the second wave transmitted by the first ground transmitter 221 provided away from the vehicle 1 is thus longer than the transmission time of the second wave transmitted by the first ground transmitter provided closer to the vehicle 211. The second wave transmitted from the first ground transmitter 221 positioned away from the vehicle 1 may be securely received at the vehicle 1.

According to the embodiment, the predetermined area is a parking area A where the vehicle 1 is parked. The ground apparatus 200 includes a transmitter-receiver (a second ground transmitter) 231 provided at a position (third position) P3 that is placed at a boundary of the parking area A and is away from at least one of the first position P1 and the second position P2 in the entry direction of the vehicle 1 to the parking area A, the second ground transmitter 231 transmitting a third wave at least in a direction inward the parking area A and orthogonal to the entry direction of the vehicle 1 to the parking area A in response to the transmission of the second wave by at least one of the plurality of first ground transmitters 211, 221. The reception controller 103 receives the third wave during the reception control. The guide controller 101 determines timing where the guide control for parking the vehicle 1 is terminated on a basis of a change of a signal level of the third wave received during the reception control performed by the reception controller 103, the signal level changing depending on a position of the vehicle 1.

The vehicle 1 is appropriately parked within the parking area A using the third wave accordingly.

According to the embodiment, the second ground transmitter 231 transmits the third wave in a third mode that is different from the first mode and the second mode.

The second wave and the third wave are identifiable therebetween, so that the peak signal level of the third wave is easily detectable.

According to the embodiment, the second ground transmitter 231 transmits the third wave including the greater number of bursts than the number of bursts of the second wave.

The third wave from the second ground transmitter 231 is thus securely receivable at the vehicle 1.

According to the embodiment, the onboard transmitter 110*a* and the onboard receiver 110*a* are integrally constituted as a first transmitter-receiver including a single oscillator (a single first oscillator) 110*b* that oscillates to transmit and receive an ultrasonic wave. Each of the plurality of ground receivers 211, 221 and each of the corresponding plurality of first ground transmitters 211, 221 are integrally constituted as a second transmitter-receiver including a single second oscillator 211*a*, 221*a* that oscillates to transmit and receive an ultrasonic wave.

The configuration of the vehicle guidance system may be simplified accordingly.

According to the embodiment, an onboard apparatus 100 configured to be mounted at a vehicle 1, the onboard apparatus 100 includes a guide controller 101 performing a guide control for guiding the vehicle 1 to enter a predetermined area A through an entrance X thereof, the predetermined area A being provided on a ground, a transmission controller 102 performing a transmission control for transmitting a first wave to an outside of the vehicle 1 by a transmitter-receiver (an onboard transmitter) 110*a* that is configured to be mounted at the vehicle 1, the transmission control being performed in preparation for the guide control performed by the guide controller 101, and a reception controller 103 performing a reception control for receiving a second wave by the transmitter-receiver (an onboard receiver) 110*a* that is configured to be mounted at the vehicle 1, the second wave being transmitted in response to the first wave from transmitter-receivers (a plurality of ground receivers) 211, 221 at least in a direction opposite to an entry direction of the vehicle 1 to the predetermined area A, at least one of the plurality of ground transmitters 211, 221 being configured to be arranged at a first position P1 and at least one of the plurality of ground transmitters 211, 221 being configured to be arranged at a second position P2, the first position P1 and the second position P2 corresponding to opposed ends of the entrance X opposed in a width direction thereof. The guide controller 101 determining an entry line to the entrance for the vehicle 1 based on a change of a signal level of the second wave received during the reception control performed by the reception controller 103, the signal level changing depending on a position of the vehicle 1.

The aforementioned construction enables detection of positions corresponding to the opposed ends of the entrance X in the width direction to determine the appropriate entry line using transmission and reception results of the first wave and the second wave without using an image that may be influenced by environment, for example. The vehicle 1 may be thus accurately guided to the predetermined area A without being influenced by environment.

According to the embodiment, a ground apparatus 200 configured to be provided on a ground, the ground apparatus 200 includes transmitter-receivers (a plurality of ground receivers) 211, 221 at least one of which is configured to be arranged at a position (first position) P1 and at least one of which is configured to be arranged at a position (second position) P2 to receive a first wave that is transmitted to an outside of a vehicle 1 from an onboard transmitter 110*a* that is configured to be mounted at the vehicle 1, the first position P1 and the second position P2 corresponding to opposed ends of an entrance X opposed in a width direction thereof, the entrance X being provided at a predetermined area A on the ground, and transmitter-receivers (a plurality of first ground transmitters) 211, 221 provided corresponding to the plurality of ground receivers 211, 221, at least one of the plurality of ground transmitters 211, 221 transmitting the second wave in response to a reception of the first wave by at least one of the plurality of ground receivers 211, 221 at least in a direction opposite to an entry direction of the vehicle 1 to the predetermined area A.

The aforementioned construction enables the vehicle 1 to detect positions corresponding to the opposed ends of the entrance X in the width direction to determine the appropriate entry line using transmission and reception results of the first wave and the second wave without using an image that may be influenced by environment, for example. The vehicle 1 may be thus accurately guided to the predetermined area A without being influenced by environment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle guidance system, comprising;
an onboard apparatus configured to be mounted at a vehicle; and
a ground apparatus configured to be provided on a ground,
the onboard apparatus including:
   a guide controller performing a guide control for guiding the vehicle to enter a predetermined area through an entrance thereof, the predetermined area being provided on the ground;
   a transmission controller performing a transmission control for transmitting a first wave to an outside of the vehicle by an onboard transmitter that is configured to be mounted at the vehicle, the transmission control being performed in preparation for the guide control performed by the guide controller; and
   a reception controller performing a reception control for receiving a second wave obtained in response to the first wave by an onboard receiver that is configured to be mounted at the vehicle, the ground apparatus including:
- a plurality of ground receivers at least one of which is configured to be arranged at a first position and at least one of which is configured to be arranged at a second position to receive the first wave, the first position and the second position corresponding to opposed ends of the entrance opposed in a width direction thereof; and
- a plurality of first ground transmitters provided corresponding to the plurality of ground receivers, at least one of the plurality of first ground transmitters transmitting the second wave in response to a reception of the first wave by at least one of the plurality of ground receivers at least in a direction opposite to an entry direction of the vehicle to the predetermined area, the guide controller determining an entry line to the entrance for the vehicle based on a change of a signal level of the second wave received during the reception control performed by the reception controller, the signal level changing depending on a position of the vehicle.

2. The vehicle guidance system according to claim 1, wherein
each of the plurality of first ground transmitters transmits the second wave that indicates a peak signal level in the direction opposite to the entry direction of the vehicle to the predetermined area,
the guide controller determines the entry line to the entrance based on a position of the vehicle obtained at a timing where the second wave that is received during the reception control performed by the reception controller indicates a peak signal level.

3. The vehicle guidance system according to claim 2, wherein
at least one of the plurality of first ground transmitters configured to be arranged at the first position transmits the second wave in a first mode and at least one of the plurality of first ground transmitters configured to be arranged at the second position transmits the second wave in a second mode, the first mode and the second mode being different from each other,
the guide controller determines the entry line based on two positions of the vehicle obtained at respective timings where the second wave transmitted in the first mode indicates a peak signal level and the second wave transmitted in the second mode indicates a peak signal level.

4. The vehicle guidance system according to claim 3, wherein
at least one of the plurality of first ground transmitters being inhibited from corresponding to one of the plurality of ground receivers that first receives the first wave transmits the second wave including the greater number of bursts than the second wave transmitted by at least one of the plurality of first ground transmitters provided corresponding to the one of the plurality of ground receivers that first receives the first wave.

5. The vehicle guidance system according to claim 1, wherein
the predetermined area is a parking area where the vehicle is parked,
the ground apparatus includes a second ground transmitter provided at a third position that is placed at a boundary of the parking area and is away from at least one of the first position and the second position in the entry direction of the vehicle to the parking area, the second ground transmitter transmitting a third wave at least in a direction inward the parking area and orthogonal to the entry direction of the vehicle to the parking area in response to the transmission of the second wave by at least one of the plurality of first ground transmitters,
the reception controller receives the third wave during the reception control,
the guide controller determines a timing where the guide control for parking the vehicle is terminated on a basis of a change of a signal level of the third wave received during the reception control performed by the reception controller, the signal level changing depending on a position of the vehicle.

6. The vehicle guidance system according to claim 5, wherein the second ground transmitter transmits the third wave in a third mode that is different from the first mode and the second mode.

7. The vehicle guidance system according to claim 6, wherein the second ground transmitter transmits the third wave including the greater number of bursts than the number of bursts of the second wave.

8. The vehicle guidance system according to claim 1, wherein
the onboard transmitter and the onboard receiver are integrally constituted as a first transmitter-receiver including a single first oscillator that oscillates to transmit and receive an ultrasonic wave,
each of the plurality of ground receivers and each of the corresponding plurality of first ground transmitters are integrally constituted as a second transmitter-receiver including a single second oscillator that oscillates to transmit and receive an ultrasonic wave.

9. An onboard apparatus configured to be mounted at a vehicle, the onboard apparatus comprising:
a guide controller performing a guide control for guiding the vehicle to enter a predetermined area through an entrance thereof, the predetermined area being provided on a ground;
a transmission controller performing a transmission control for transmitting a first wave to an outside of the vehicle by an onboard transmitter that is configured to be mounted at the vehicle, the transmission control being performed in preparation for the guide control performed by the guide controller; and
a reception controller performing a reception control for receiving a second wave by an onboard receiver that is configured to be mounted at the vehicle, the second wave being transmitted in response to the first wave from a plurality of ground transmitters at least in a direction opposite to an entry direction of the vehicle to the predetermined area, at least one of the plurality of ground transmitters being configured to be arranged at a first position and at least one of the plurality of ground transmitters being configured to be arranged at a second position, the first position and the second position corresponding to opposed ends of the entrance opposed in a width direction thereof,
the guide controller determining an entry line to the entrance for the vehicle based on a change of a signal level of the second wave received during the reception control performed by the reception controller, the signal level changing depending on a position of the vehicle.

10. A ground apparatus configured to be provided on a ground, the ground apparatus comprising:
a plurality of ground receivers at least one of which is configured to be arranged at a first position and at least one of which is configured to be arranged at a second position to receive a first wave that is transmitted to an outside of a vehicle from an onboard transmitter that is configured to be mounted at the vehicle, the first position and the second position corresponding to opposed ends of an entrance opposed in a width direction thereof, the entrance being provided at a predetermined area on the ground; and a plurality of ground transmitters provided corresponding to the plurality of ground receivers, at least one of the plurality of ground transmitters transmitting the second wave in response to a reception of the first wave by at least one of the plurality of ground receivers at least in a direction opposite to an entry direction of the vehicle to the predetermined area.

\* \* \* \* \*